United States Patent
Yang (10) Patent No.: US 11,947,350 B2
(45) Date of Patent: Apr. 2, 2024

(54) DEVICES, SYSTEMS, AND METHODS FOR OPERATING INTELLIGENT VEHICLES USING SEPARATE DEVICES

(71) Applicant: Intelligent Racing Inc., San Ramon, CA (US)

(72) Inventor: Allen Yang, San Ramon, CA (US)

(73) Assignee: Intelligent Racing Inc., San Ramon, CA (US)

( * ) Notice: Subject to any disclaimer, the term of this patent is extended or adjusted under 35 U.S.C. 154(b) by 0 days.

(21) Appl. No.: 18/264,518

(22) PCT Filed: Feb. 9, 2022

(86) PCT No.: PCT/US2022/070586
§ 371 (c)(1),
(2) Date: Aug. 7, 2023

(87) PCT Pub. No.: WO2022/174230
PCT Pub. Date: Aug. 18, 2022

(65) Prior Publication Data
US 2024/0045421 A1 Feb. 8, 2024

Related U.S. Application Data

(60) Provisional application No. 63/148,040, filed on Feb. 10, 2021.

(51) Int. Cl.
*G05D 1/00* (2006.01)
*A63H 17/39* (2006.01)
(Continued)

(52) U.S. Cl.
CPC ......... *G05D 1/0022* (2013.01); *A63H 17/395* (2013.01); *A63H 30/04* (2013.01); *G05D 1/0038* (2013.01); *G05D 1/0088* (2013.01)

(58) Field of Classification Search
CPC .. G05D 1/0022; G05D 1/0038; G05D 1/0088; A63H 17/395; A63H 30/04
See application file for complete search history.

(56) References Cited

U.S. PATENT DOCUMENTS 6,438,456 B1 8/2002 Feddema et al.
9,927,812 B2 * 3/2018 Wang ................... G05D 1/0016
(Continued)

FOREIGN PATENT DOCUMENTS

WO 2022174230 A1 8/2022

OTHER PUBLICATIONS

International Search Report and Written Opinion for corresponding International PCT Application No. PCT/US2022/070586, dated May 9, 2022.

(Continued)

*Primary Examiner* — Rachid Bendidi
(74) *Attorney, Agent, or Firm* — K&L Gates LLP (57) ABSTRACT

A system for providing autonomous driving of a radio controlled vehicle through an ambient environment is disclosed herein. The system can include a modular device with at least one sensor configured to generate signals associated with characteristics of the ambient environment, a bed plate configured to be mechanically coupled to the RC vehicle, and a modular control circuit configured to be mechanically coupled to the bed plate and communicably coupled to the modular device, wherein the modular control circuit is configured to be communicably coupled to hardware of the RC vehicle and control the RC vehicle in response to commands received from the modular device.

10 Claims, 4 Drawing Sheets

(51) Int. Cl.
*A63H 17/395* (2006.01)
*A63H 30/04* (2006.01)

(56) References Cited

U.S. PATENT DOCUMENTS

| | | | |
|---|---|---|---|
| 10,537,817 B2 * | 1/2020 | Musliner | A63H 17/36 |
| 10,741,061 B1 * | 8/2020 | Krupnik | G06F 3/04883 |
| 2012/0015686 A1 | 1/2012 | Krupnik | |
| 2013/0324004 A1 | 12/2013 | Schwartz | |
| 2015/0021108 A1 | 1/2015 | Gettings et al. | |
| 2015/0096500 A1 | 4/2015 | McCain | |
| 2018/0104609 A1 | 4/2018 | Musliner | |
| 2021/0056837 A1 * | 2/2021 | Krupnik | G08C 17/02 |

OTHER PUBLICATIONS

Wzorek et al., "GSM Technology as a Communication Media for an Autonomous Unmanned Aerial Vehicle", 21th Bristol UAV Systems Conference, Apr. 2006.

* cited by examiner

DEVICES, SYSTEMS, AND METHODS FOR OPERATING INTELLIGENT VEHICLES USING SEPARATE DEVICES

CROSS-REFERENCE TO RELATED APPLICATIONS

This application is a U.S. national stage application, filed under 35 U.S.C. § 371, of International Application No. PCT/US2022/070586, entitled DEVICES, SYSTEMS, AND METHODS FOR OPERATING INTELLIGENT VEHICLES USING SEPARATE DEVICES, which was filed on Feb. 9, 2022, and which claims priority to U.S. Provisional Patent Application Ser. No. 63/148,040, entitled METHODS AND SYSTEMS FOR INTELLIGENT VEHICLES USING EXISTING MOBILE DEVICES, filed Feb. 10, 2021, the disclosure of which is hereby incorporated by reference in its entirety.

FIELD

The present disclosure is generally related to autonomous vehicles and, more particularly, is directed to improved devices, systems, and methods for using separate user devices for the autonomous operation of a vehicle.

SUMMARY

In some embodiments, methods and systems for providing an automated driving vehicle using sensors from a separate user device are disclosed. In some embodiments, a system for positioning the user device onto a remote controlled vehicle and using sensors from the user device to control the remote controlled vehicle are presented. In some embodiments, the system includes a unique chassis that attaches to existing remote controlled vehicles so that the user's separate device can be mounted onto the remote controlled vehicle. In some embodiments, circuitry is included that provides an interface from the user's separate device to the remote controlled vehicle. The circuitry may provide a hardware layer to the system, and in some embodiments a firmware layer is also included that links the hardware components together. In some embodiments, artificial intelligence programming is provided in the user's separate device and utilizes the sensors in the user's separate device to command how to control or drive the remote controlled vehicle. In some embodiments, manual control of the remote controlled vehicle is also included, and can be used to override or supplement control with the user's separate device.

In some embodiments, a system is introduced for providing autonomous driving of a remote controlled (RC) vehicle using a user's mobile device. The mobile device may include at least one sensor and a wired or wireless interface. The system may include: a chassis configured to be mounted onto the RC vehicle. The chassis may include: a slot configured to carry the user's smartphone; and circuitry configured to communicatively couple to the RC vehicle and to send signals to operate the RC vehicle. The circuitry may include an interface to connect to the wired or wireless interface of the user's mobile device and configured to receive commands from the user's mobile device that can be routed to the RC vehicle.

In some embodiments of the system, the circuitry is further configured to receive commands from the user's mobile device that utilize the at least one sensor.

In some embodiments, the system further includes a virtualization layer expressed in software or firmware configured to provide a platform for programming artificial intelligence (AI) to control the RC vehicle.

In some embodiments of the system, the virtualization layer comprises a simulator abstraction module, an autonomous driving abstraction module, and a vehicle hardware abstraction module.

In some embodiments of the system, the virtualization layer is configured to provide the platform for programming AI via a software simulator connected to the simulator abstraction module, wherein the software simulator is operated on a user device separate from the user's mobile device.

In some embodiments, the system further includes an interface to a virtual reality (VR) or augmented reality (AR) device that can be worn by the user such that the user is able to see a camera view of the user's mobile device while the mobile device is mounted on the RC vehicle when the RC vehicle is moving.

In some embodiments of the system, the VR or AR interface is configured to provide live visual streaming to the VR or AR device, using a visual data streaming functionality of the user's mobile device.

In some embodiments of the system, the circuitry is further configured to communicate with a manual interface to the RC vehicle.

In some embodiments of the system, the circuitry is further configured to send commands to the RC vehicle based on received inputs from the manual interface.

In some embodiments of the system, the circuitry comprises a safe mode component that is configured to override commands received from the user's mobile device.

BRIEF DESCRIPTION OF THE DRAWINGS

Some embodiments are illustrated by way of example and not limitation in the figures of the accompanying drawings.

DETAILED DESCRIPTION

Example methods, apparatuses, and systems (e.g., machines) are presented for controlling a driving vehicle using an existing user's mobile device and programming the control of the driving vehicle with artificial intelligence through the user's mobile device. As an entry point into familiarizing a wider audience with artificial intelligence (AI) and computer programming, remote controlled (RC) vehicles with interfaces to be controlled by AI can provide a fun and concrete entry point. Often times, the hardware and software needed to practice programming, particularly in AI, is very complex, and current solutions offer expensive barriers that prevent these skills from being experienced by a wider audience. Aspects of the present disclosure provide a solution to connect a user's existing mobile device, such as their smartphone, to an existing RC vehicle, such as an ordinary RC car off the shelf, and to program the RC in autonomous driving and control with minimal additional equipment.

In some embodiments, the hardware includes a chassis that attaches on top of an RC car and includes a slot to hold the user's smartphone. Circuitry coupled to the chassis interfaces with the mounted smartphone's sensors, such as the camera, LIDAR, touchscreen, microphone, speakers, positioning systems, Wi-Fi, Bluetooth, cellular systems, etc., to convey instructions to the RC car. Software that can be downloaded into the smartphone can allow for AI programming by the user, which is then used to control the RC car by accessing the smartphone's sensors and sending commands to the circuitry coupled to the mounted chassis. In this way, using just the existing smartphone and the hardware and software of the present disclosure, a user can implement AI algorithms in an RC car to conduct autonomous driving. The user can then practice AI programming skills, and refine and hone the use of sensors and algorithms in a practical way with immediate feedback. This allows for a cost effective and more readily accessible solution to introduce more people to AI and programming in general.

In some embodiments, the example hardware and software components may be applied to other existing vehicles, such as aerial robots, legged robots, or robot arms. The user's smartphone, when coupled to the robot, can provide sensing capabilities that provide inputs for use in the AI program. The hardware and software interface of the present disclosure may connect the sensors of the smartphone and the program by the user to control the robot.

In some embodiments, the circuitry coupled to the mounted chassis also allows for manual overrides, such as a switch to receive inputs from the RC manual control device that is typically provided with the purchase of the RC car. The manual control allows for more safety and increased feedback by making the RC car more easily retrievable, and provides flexibility for the number of ways the RC car may be used. For example, while in line of sight, the manual controls of the RC car can be used, but when out of line of sight, the AI controls of the RC car, as provided by the mounted smartphone, can be used.

In some embodiments, the software downloaded into the smartphone provides for a virtual reality interface that allows for the user to see what the smartphone camera sees while mounted on the RC car. The software may utilize the camera data and send it to a VR device worn by the user, who can then experience the movement of the RC car while it is being driven autonomously or manually.

In some embodiments, the AR and VR principles described herein may also be implemented in gaming scenarios, such as e-sports or handheld consoles. Peer to peer racing with multiple vehicles and each of the user's mobile devices may be linked together in a real world setting utilizing the intelligent RC vehicles of the present disclosures. Each user may participate using the point of view from the mobile devices' camera.

In some embodiments, an apparatus to attach a mobile device to other robots is also provided. Similar to the chassis provided herein, another similar mounting apparatus can be attached to other robots so as to utilize the user's mobile device sensors. The principles described herein may allow a user to control another kind of robot in an AR or VR environment. In addition, the virtualization layer disclosed below may also allow for other kinds of robots to be controlled autonomously using sensors from a separate device, such as the user's mobile device.

Figure 1:
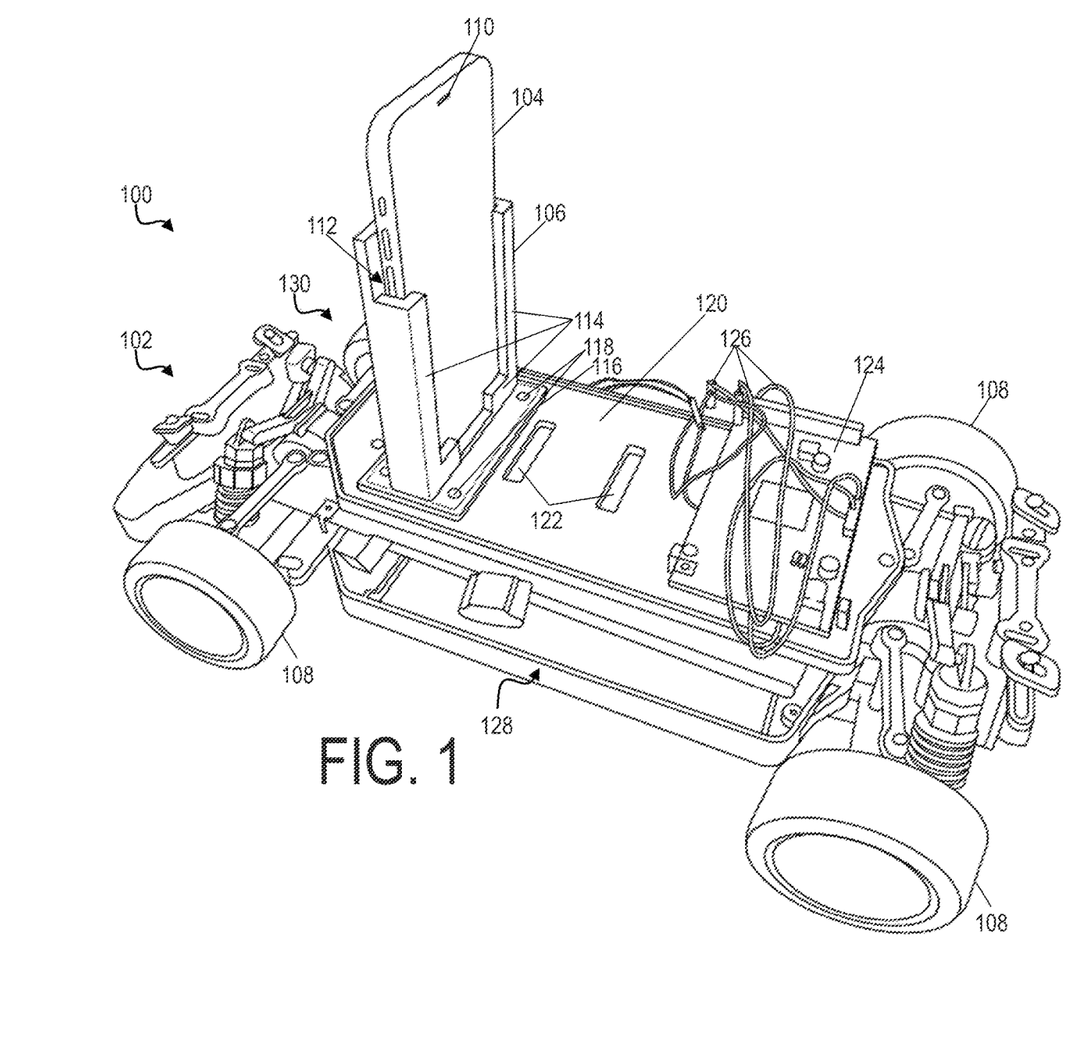
FIG. 1 illustrates a system for operating an intelligent vehicle using a separate device, in accordance with at least one non-limiting aspect of the present disclosure.

Referring now to FIG. 1, a system 100 for operating an intelligent vehicle 102 using a separate device 104 is depicted in accordance with at least one non-limiting aspect of the present disclosure. According to the non-limiting aspect of FIG. 1, the system 100 can include the vehicle 102, itself, along with a chassis 106 configured to accommodate a separate device 104. Without loss of generality, the device 104 may be positioned to have forward, backward, and/or other three-dimensional orientation with respect to system 100. As depicted in FIG. 1, the vehicle 102 can include one or more wheels 108 configured such that the vehicle 102 can traverse terrain. For example, the vehicle 102 of FIG. 1 can include a form factor similar to that of a remotely controlled car. However, according to other non-limiting aspects, the vehicle 102 can include other components (e.g., engines, nose-cones, rotors, propellers, fins, wings, air cushions, seals, etc.) such that the vehicle 102 can be alternately and/or additionally configured to traverse other mediums, including the atmosphere, water, and/or space, amongst others. In other words, according to other non-limiting aspects, the vehicle 102 can be configured as a remotely controlled drone, airplane, helicopter, rocket, boat, submarine, and/or hovercraft, amongst other vehicle types.

In further reference to FIG. 1, the system 100 can also include a chassis 106 configured to accommodate a device 104 that is structurally and/or functionally separate from the vehicle 102, itself. In other words, the device 104 of FIG. 1 can be commercially secured by a user for a primary purpose other than the operation of the vehicle 102. Notably, the device 104 can be configured for wireless and/or wired communications with other devices and can include one or more sensors 104 configured to detect features of an ambient environment surrounding the device 104. For example, according to the non-limiting aspect of FIG. 1, the device 104 can include a user's smartphone configured for wireless communications via ad hoc (e.g., Bluetooth®, Near Field Communications, RFID, etc.) and/or infrastructure networks (e.g., cellular, WiFi®, radio, etc.) and includes one or more sensors 110, such as a camera, configured to visually detect features within the ambient environment and generate image data associated with detected features. It shall be appreciated that the device 104 of FIG. 1 can include any number of antennas, processors, memories, receivers, transmitters, and/or transceivers to enable the aforementioned functionalities. However, according to other non-limiting aspects, the device 104 can include a tablet, a personal digital assistant, a laptop computer, and/or a smart watch, amongst other devices configured for sensing and computational purposes. According to still other non-limiting aspects, the device 104 can include other sensors configured to detect other features within the ambient environment, including light detection and ranging sensors ("LIDAR") configured to characterize and/or map the ambient environment, microphones configured to detect sonic excitations, gyroscopes, configured to detect mechanical excitations, and/or infrared cameras configured to detect thermal excitations within the ambient environment, amongst others. Without loss of generality, the sensor 110 of FIG. 1, or any of the other sensors referenced in regards to other non-limiting aspects, may be positioned to face forward, backward, or other three-dimensional orientation with respect to the vehicle 100.

Still referring to FIG. 1, the chassis 106 can be geometrically configured to accommodate and secure the device 104 to the vehicle 102. For example, according to the non-limiting aspect of FIG. 1, the chassis 106 can define a slot 112 of corresponding geometry to the device 104 and can include one or more walls 114 configured to secure the device 104 to the vehicle 102 and prevent it from decoupling from the vehicle 102 in response to excitations resulting from vehicle 102 operation. The chassis 106 can be integral to the vehicle 102 and/or configured for selective mechanical and/or electrical coupling to the vehicle 102. For example, according to the non-limiting aspect of FIG. 1, the chassis 106 can include a mount 116 configured as a face plate with one or more connective elements 118 configured to mechanically secure the chassis 106 and a device 102 installed within the chassis 106 to the vehicle 102. According to some non-limiting aspects, the connective elements 118 can be holes and/or tapped inserts configured to accommodate screws and/or bolts that connect the chassis 106 to the vehicle 102.

According to the non-limiting aspect of FIG. 1, wherein the chassis 106 is configured for selective mechanical and electrical coupling, the chassis 106 can be mounted on any commercially available remotely controlled vehicle, such as the vehicle 102 of FIG. 1. As such, the chassis 104 can be manufactured separate from the vehicle 102 via various materials and processes. For example, according to some non-limiting aspects, the chassis 106 and/or mount 116 can be produced via three-dimensional printing, plastic molding, and/or machined from wood or metal (e.g., via computer numerical control ("CNC") methods, etc.). The mount 116 can be configured to mechanically interface with a bed plate 120 via a plurality of slots 122 disposed throughout the bed plate 120. Similar to the chassis 196 and/or mount 116, the bed plate 120 can be separately manufactured via three-dimensional printing, plastic molding, and/or machined from wood or metal (e.g., via computer numerical control ("CNC") methods, etc.). Moreover, each of slot 122 disposed throughout the bed plate 120 can be configured to serve as a mechanical and/or electrical interface such that the device 104 can be effectively integrated into the mechanical and electrical systems of the vehicle 102. For example, whereas a first slot (not visible) of the plurality of slots 122 can be configured to accommodate the chassis 106, a second slot (not visible) of the plurality of slots 122 can be configured to accommodate a control circuit 124, such as a microprocessor or logic-based controller, amongst others. The bed plate 120 can further include one or more electrical connections 126 (e.g., circuits, wires, connectors, etc.) configured to establish electrical communication between the device 104 and the control circuit 124. One such electrical connection 126 (not visible) can be specialized and dimensionally positioned within the chassis 106 such that the electrical connection 126 aligns with a specific data connection (e.g., lightning cable, micro-universal serial bus ("USB"), USB-C, etc.) on the device 104, thereby enabling the device 104 to send and receive signals to and from the control circuit 124. Of course, according to other non-limiting aspects, the device 104 can be configured to wirelessly communicate signals to and from the control circuit 124, for example via an ad hoc link (e.g., Bluetooth®, NFC, etc.). According to the non-limiting aspect of FIG. 1, the device 104 can be a smartphone, such as an Apple iPhone® or a Google Android® phone, and the control circuit 124 can be an Arduino® microcontroller, for example. Accordingly, the chassis 106, mount 116, bed plate 120, and slots 122 of FIG. 1 can be geometrically and electrically configured to accommodate such devices.

In order to effectively operate the vehicle 102 of FIG. 1, slight modifications to the vehicle 102 can be implemented. For example, the vehicle 102 of FIG. 1 can be rewired such that a pulse-width modulation ("PWM") signal from a remote control receiver that is native to the vehicle 102 "off the shelf," to the control circuit 124 installed on the bed plate 120 via one of the slots 122. Since the one or more electrical connections 126 (e.g., circuits, wires, connectors, etc.) are configured to establish electrical communication between the device 104 and the control circuit 124, the control circuit 124 can receive control signals from the device 104 and forward them to a chassis 128 of the vehicle 102, depending on user preference and/or intended application. According to some non-limiting aspects, the control circuit 124 can be configured to selectively accept one of multiple signals it receives to forward to the chassis 128 of the vehicle 102 for operation, as will be discussed in further detail herein.

In other words, the device 104 of FIG. 1 can be configured to communicate with the control circuit 124 and the control circuit 124 can be configured to communicate with the chassis 128 of the vehicle 102 via the one or more electrical connections 126. Additionally, the chassis 106 can be specifically configured relative to the device 104, such that a desired sensor 110 of the device 104 is preferably positioned to assist a user in using the device 104 to manually and/or autonomously operate the vehicle 102. According to FIG. 1, the slot 112 defined by the chassis 106 can accommodate the device 104 such that one or more sensors 110 is in a desired positioned relative to the vehicle 102. For example, where the one or more sensors 110 is a camera of the device 104, the chassis 106 can be configured such that, when the device 104 is properly installed, it can serve as a visual input for the manual and/or autonomous operation of the vehicle. Accordingly, the system 100 of FIG. 1 can enable the manual and/or autonomous operation of the vehicle 102 without the need for additional sensors. As such, the system 100 of FIG. 1 can enable increased and more efficient access to manual and/or autonomous vehicle 102 operation for the average consumer.

According to some non-limiting aspects, the control circuit 124 can be communicably coupled to a memory configured to store a vehicle 102 operation platform, or software, capable of assisting in the operation of the vehicle 102. For example, software can be installed onto a memory of the device 104 to provide the control circuit 124 and vehicle 102 with varying degrees of functionality required for the desired operation. According to some non-limiting aspects, this software can be a mobile application downloaded by a user via the device 104 from an "app store," or other means of acquisition. The platform contemplated by the present disclosure and implemented via the system 100 of FIG. 1 can provide functionality in the form of, at least, three tasks, generally: 1) the software can command the device 104 to utilize the one or more sensors 110 to capture image data and/or motion data (e.g. via a camera, a micro-electromechanical system ("MEMS") gyroscope, an accelerometer, an inertial measurement unit ("IMU"), etc.); 2) the software can command the device 104 to transmit the generated data to a remote computer device, such as another device of the user, for rendering; and 3) the software can make autonomous driving decisions for the system 100 based on some artificial intelligence and/or machine learning algorithms that locally utilize the sensors 110 data without the aid of remote computing resources that are not onboard the device 104, and further control the device 104 to issue commands according to the autonomous driving decisions to control the vehicle 102. In other words, the software can enable the user to operate the vehicle beyond line of sight, because the device 104 and software can generate and provide the user with first-person views of the operating environment from the perspective of the vehicle 102. As such, the system 100 of FIG. 1 can be implemented to create a virtual immersion of the onboard driving position.

The design of the software can be portable or flexibly designed, such that the software can alter which control circuit can effectively control the vehicle 102, or robotic systems disposed on the vehicle 102, without adding significant cost for expensive modifications. As previously discussed, the software can be executed by the device 104, such as a smartphone configured to perform a broad range of autonomous tasks at the command of the software and/or user inputs, limited only by the hardware design and capabilities of the one or more sensors 110 on the device 104 and/or the chassis 128 of the vehicle 102. Accordingly, the software can facilitate autonomous operation of the vehicle 102. Additionally and/or alternatively, the software can provide the user with the ability to override commands generated by the software, thereby facilitating manual operation of the vehicle 102. Moreover, the inclusion of a separate device 104 and control circuit 124 enables the control circuit 124 to override commands transmitted to the robot chassis, thereby facilitating the instantaneous switching of vehicle operation between autonomous and manual control. More specifically, the software on the device 104 may simply pass through the manual control commands issued by the user to the control circuit 124 without further modification. This allows the user to directly control the vehicle 102. Secondly, the software on the device 104 may completely override the manual control commands issued by the user and in effect allow some AI algorithms to take full control of the vehicle 102. This includes the scenarios of full autonomous driving without human supervision and the scenarios of emergency safety override such as stopping the vehicle 102 before an imminent collision. Finally, the software on the device 104 can modify the manual control commands issued by the user by augmenting additional control commands. In some autonomous driving scenarios, this allows the user's control of the vehicle 102 to be aided by the software for enhancing safety or performance, such as auto-pilot functions including dynamic cruise control, collision avoidance, autonomous lane changing, and autonomous parking, etc. However, in some e-sports scenarios, the software on the device 104 may add control constraints to limit the performance of the vehicle 102 according to some game plays, therefore making the vehicle 102 to be more difficult to control by the user. For example, in a virtual reality environment, the position of the vehicle 102 may collide with a virtual obstacle (such as a virtual water puddle or a virtual sand trap). The software that is in sync with the virtual reality environment may reduce the drivability of the vehicle 102's throttle or steering and in effect introduce challenges for the user to control the vehicle 102 when the user also perceives a virtual obstacle in the virtual reality environment.

Figure 2:
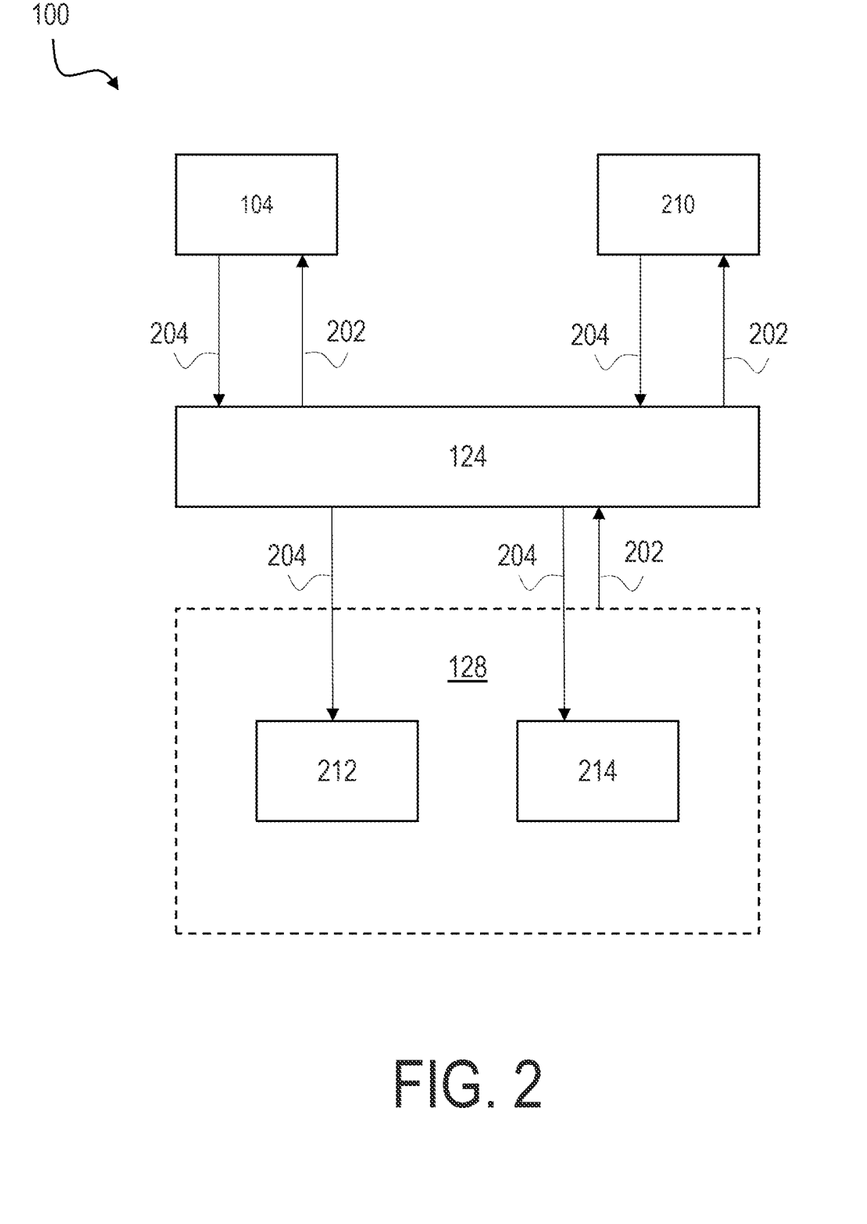
FIG. 2 illustrates a functional block diagram of the system of FIG. 1, in accordance with at least one non-limiting aspect of the present disclosure.

Referring now to FIG. 2, a functional block diagram of the system 100 of FIG. 1 that illustrates the various interactions between the aforementioned system 100 components is depicted in accordance with at least one non-limiting aspect of present disclosure. As previously discussed, the vehicle 102 (FIG. 1) chassis 128 can provide the foundational structure to support the operation of the vehicle 102 (FIG. 1), including various other components, such as a motor 212 and a servomechanism 214 configured to receive command signals 202 (e.g., PWM signals, etc.) from the control circuit 124 and generate telemetry that can be transmitted back to the control circuit 124 via telemetry signals 202. This functional configuration is illustrated via the block diagram of FIG. 2. As previously discussed, the control circuit 124 can include an Arduino® type microcontroller, coupled to the chassis 128 of the vehicle 102 (FIG. 1), which can be and wired to control the motor 212 and/or servo 214 of the vehicle 128. The control circuit 124 can therefore receive vehicle 102 (FIG. 1) telemetry 202 from various components of the RC in order to provide continuous control and operation of the vehicle 102 (FIG. 1). The chassis 128 can also support the positioning of a separate device 104, such as the user's smartphone. As previously discussed, the device 104 can be communicatively coupled to the control circuit 124 via a wired or wireless connection, via the previously discussed electrical connections 126 (FIG. 1) and/or Bluetooth®. The device 104 may provide command signals 204 to the control circuit 124 via the wired and/or wireless connection, based on data generated by its sensors 110 (FIG. 1), such as a camera. The device 104—and more specifically, the software implemented by the device 104—can include an artificial intelligence platform, such as a neural network, or a machine learning platform, such as a supervised algorithm, an unsupervised algorithm, or a reinforcement algorithm, configured to autonomously operate the vehicle 102. According to some non-limiting aspects, the vehicle 102 can still be manually operated via a radio controlled receiver 210, which can also be configured to transmit commands 204 and receive telemetry 202 from the control circuit 124.

Overall, the aforementioned features of the present disclosure can enable a stock vehicle 102 (FIG. 1) chassis 128 to be integrated with a separately manufactured chassis 106 (FIG. 1), bed plate 120 (FIG. 1), control circuit 124, and device 104 to form an improved vehicle 102 (FIG. 1) that costs less, is easily portable, and extremely powerful, enabling technological improvements to conventional, stock vehicles 102 (FIG. 1).

Figure 3:
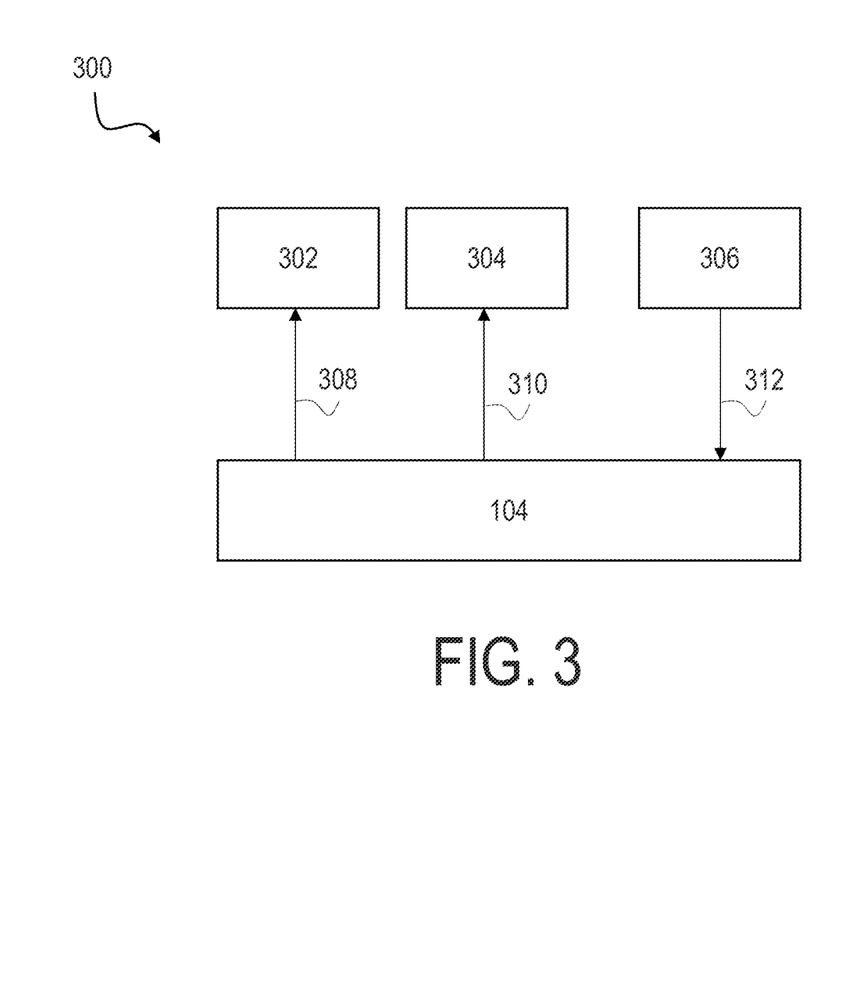
FIG. 3 illustrates a block diagram of the software architecture employed by a device of the system of FIG. 1, according to at least one non-limiting aspect of the present disclosure.

Referring now to FIG. 3, a block diagram illustrating just some of the technological improvements provided by the system 100 of FIG. 1 is depicted in accordance with at least one non-limiting aspect of the present disclosure. According to the non-limiting aspect of FIG. 3, the system 100 (FIG. 1) can utilize functionality of the device 104 to provide an augmented reality ("AR") and/or a virtual reality ("VR") experience with the vehicle 102 (FIG. 1). The software may include an AR/VR game layer 302, a simulation layer 304, and/or a virtualization layer 306. The AR/VR game layer 302 can generate augmented or virtual games based on image data 308 received from the device 104. The simulation layer 304 can generate a simulation of the vehicle 102 (FIG. 1) and ambient environment based on telemetry 310 received from the device 104. The virtualization layer 306 can generate generate autonomous driving code 312 based on the image data 308 and/or telemetry 310 received from the device 104. The generated code 312 can be downloaded to the device 104 and implemented to execute and/or improve autonomous operation of the vehicle 102 (FIG. 1).

According to the non-limiting aspect of FIG. 3, the device 104 can be configured to stream capture video data via its one or more sensors 110 (FIG. 1) and can stream captured video data via a wired or wireless connection to a head mounted display (not shown) worn by the user. The software executed by the device 104 can also transmit telemetry data associated with the vehicle 102 (FIG. 1) in real-time to a remote computing device (not shown) of the user to generate the AR and/or VR experience, or for alternative uses associated with a vehicle 102 (FIG. 1) simulation provided by the software. For example, such telemetry data can include a six-degree-of-freedom location, a velocity, an acceleration, and/or a steering angle associated with the vehicle 102 (FIG.

1), amongst other types of telemetry data. Regardless of whether or not the vehicle 102 (FIG. 1) is being operated autonomously or manually, via the receiver 210 (FIG. 2), the user may be able to experience what the vehicle 102 (FIG. 1) is experiencing via the one or more sensors 110 of the device 104 (FIG. 1), as the device 104 (FIG. 1) is mounted on the vehicle 102 (FIG. 1). The user may also experience driving in a virtual, simulated environment generated based on telemetry data provided by the vehicle 102 (FIG. 1) via a virtual, simulated vehicle 102 (FIG. 1) generated by the vehicle 102 (FIG. 1) telemetry. Similarly, telemetry data generated by the system 100 (FIG. 1) can be used to update code or practice artificial intelligence and/or machine learning algorithms to improve the simulation, as described in further detail herein.

It may be difficult to program code on a device 104, such as a smartphone, to perform specific autonomous tasks. Indeed, programming applications to accurately control robotic systems, such as the vehicle 102 of FIG. 1, can be difficult because such applications are not generally programmed on the phone itself, but rely on more capable, personal computers to program the code. Moreover, the code generally undergoes a "deployment" procedure to be installed on the device 104. However, since the device 104 is integrated with the vehicle 102 (FIG. 1), as contemplated by the present disclosure, the device 104 will be moving with the vehicle 102 (FIG. 1) and separated from a personal computer capable of programming the device 104 with updates. Obviously, this complicates the deployment and testing of autonomous code and code updates that could improve the means by which the device 104 is implemented to operate the vehicle 102 (FIG. 1). However, the system 100 (FIG. 1) contemplated by the present disclosure solves this problem via the virtualization layer 306 deployed via the device 104. According to some non-limiting aspects, the virtualization layer 306 can include middleware, such that vehicle 102 (FIG. 1) control code can be programmed and thoroughly tested on a simulator system.

Figure 4:
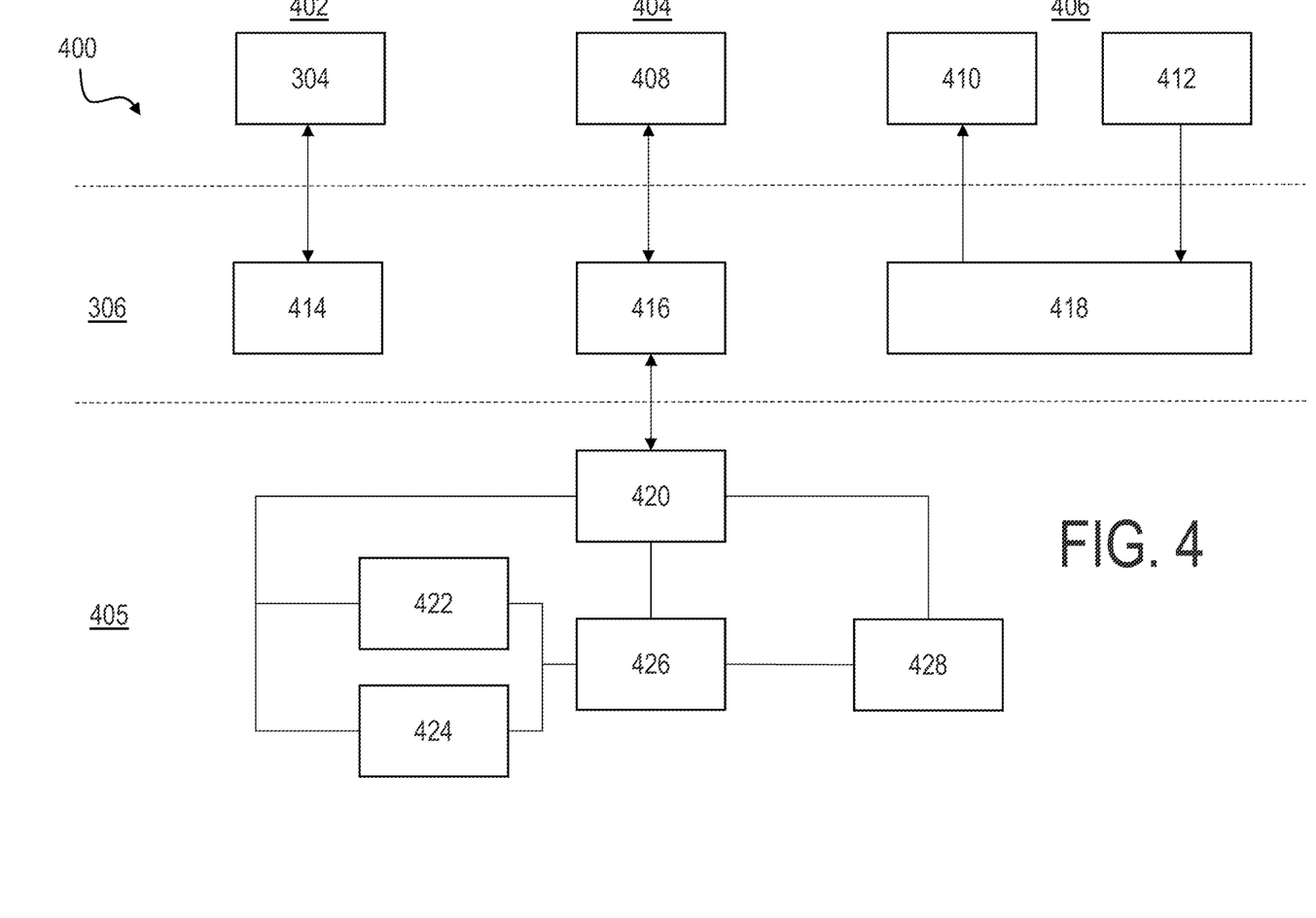
FIG. 4 illustrates a block diagram of the virtualization layer of FIG. 3, according to at least one non-limiting aspect of the present disclosure.

Referring now to FIG. 4, a block diagram of a software architecture 400 including the virtualization layer 306 of FIG. 3 is depicted in accordance with at least one non-limiting aspect of the present disclosure. According to the non-limiting aspect of FIG. 4, the architecture 400 can include a simulation and/or visualization stack 402, a machine learning library stack 404, and a vehicle hardware stack 406, amongst others. Additionally, aside from the virtualization layer 306, the architecture 400 can further include an autonomous driving algorithm library 405. As such, the virtualization layer 306 can be configured to retrieve and transmit data from the software simulator 304, a machine learning library 408, and hardware from the vehicle 102 (FIG. 1), such as actuators 410 and/or sensors 412, into the autonomous driving algorithm library 405.

According to the non-limiting aspect of FIG. 4, the virtualization layer 306 can include a simulator abstraction 414, an autonomous driving abstraction 416, and/or a vehicle hardware abstraction 416. Optionally, the virtualization layer can 306 include an abstraction of the device 104 (FIG. 1) or, at a minimum, be further configured to receive signals generated by the one or more sensors 110 (FIG. 1) on the device 104 (FIG. 1). As such, the virtualization layer 306 can communicate with the software simulator 304, various machine learning libraries 402, and/or the vehicle 102 (FIG. 1), itself. As such, the virtualization layer 306 can generate vehicle 102 (FIG. 1) operation code and/or automation algorithms, as well as updates, which can be deployed to the device 104 (FIG. 1) with zero code changes required. In other words, the virtualization layer 306 can abstract and virtualize the behavior of the vehicle 102 (FIG. 1) and ambient environment within which the vehicle 102 (FIG. 1) is traversing and can interfacing with the software simulator 304, machine learning libraries 402, and/or hardware systems 404 of the vehicle 102 (FIG. 1). The virtualization layer 306 can utilize these inputs to communicate with the autonomous driving software stack 420, which can utilize the virtualized inputs to implement and/or improve an environment mapping engine 422, an environment perception engine 424, a motion planning engine 426, and/or a controller 428 of the autonomous driving algorithm library 405.

Combining the low-cost design of adding smartphones as a robot "brain," the compatibility of the system to most RC cars and potentially to other robotic systems, and the ease of use of the software deployment and testing process using a virtualization solution, aspects of the present disclosure present a revolutionary user experience for consumers to easily add intelligence to "non-smart" or "dumb" robotic systems.

Various aspects of the subject matter described herein are set out in the following numbered clauses:

Clause 1: A system for providing autonomous driving of a radio controlled (RC) vehicle using a user's mobile device, the mobile device including at least one sensor and a communication interface, the system including: a chassis configured to be mounted onto the RC vehicle, the chassis including: a slot configured to carry the user's smartphone, and circuitry configured to communicatively couple to the RC vehicle and to send signals to operate the RC vehicle, the circuitry including an interface to connect to the communication interface of the user's mobile device and configured to receive commands from the user's mobile device that can be routed to the RC vehicle.

Clause 2: The system according to claim 1, wherein the circuitry is further configured to receive commands from the user's mobile device that utilize the at least one sensor.

Clause 3: The system according to either of clauses 1 or 2, further including a virtualization layer expressed in software or firmware configured to provide a platform for programming artificial intelligence (AI) to control the RC vehicle.

Clause 4: The system according to any of clauses 1-3, wherein the virtualization layer includes a simulator abstraction module, an autonomous driving abstraction module, and a vehicle hardware abstraction module.

Clause 5: The system according to any of clauses 1-4, wherein the virtualization layer is configured to provide the platform for programming AI via a software simulator connected to the simulator abstraction module, wherein the software simulator is operated on a user device separate from the user's mobile device.

Clause 6: The system according to any of clauses 1-5, further including an interface to a virtual reality (VR) or augmented reality (AR) device that can be worn by the user such that the user is able to see a camera view of the user's mobile device while the mobile device is mounted on the RC vehicle when the RC vehicle is moving.

Clause 7: The system according to any of clauses 1-6, wherein the VR or AR interface is configured to provide live visual streaming to the VR or AR device, using a visual data streaming functionality of the user's mobile device.

Clause 8: The system according to any of clauses 1-7, wherein the circuitry is further configured to communicate with a manual interface to the RC vehicle.

Clause 9: The system according to any of clauses 1-8, wherein the circuitry is further configured to send commands to the RC vehicle based on received inputs from the manual interface.

Clause 10: The system according to any of clauses 1-9, wherein the circuitry includes a safe mode component that is configured to override commands received from the user's mobile device.

Clause 11: A system for providing autonomous driving of a radio controlled (RC) vehicle through an ambient environment, the system including: a modular device including at least one sensor configured to generate signals associated with characteristics of the ambient environment, a bed plate configured to be mechanically coupled to the RC vehicle, wherein the bed plate includes a plurality of slots, a modular control circuit configured to be mechanically coupled to the bed plate via a first slot of the plurality of slots, wherein the modular control circuit is configured to be communicably coupled to the modular device, and wherein the modular control circuit is configured to be communicably coupled to hardware of the RC vehicle and control the RC vehicle in response to commands received from the modular device, a chassis configured to be mechanically coupled to the bed plate via a second slot of the plurality of slots, wherein the chassis is further configured accommodate and releasably secure the modular device to the RC vehicle.

Clause 12: The system according to clause 11, wherein the modular device includes a processor and a memory configured to store an algorithm that, when executed by the processor, causes the processor to: receive a signal from the sensor, determine a characteristic of the ambient environment detected by the sensor based on the signal received from the sensor, generate a command signal based, at least in part, on the determined characteristic of the ambient environment, and transmit the generated command signal to the control circuit, wherein the generated command signal causes the control circuit to autonomously operate the RC vehicle in a manner predetermined by the algorithm.

Clause 13: The method according to either of clauses 11 or 12, wherein the memory of the modular device is further configured to store a virtualization layer that, when executed by the processor, causes the processor to: receive a second signal from the sensor, determine a second characteristic of the ambient environment detected by the sensor, and autonomously modify the algorithm stored in the memory of the modular device based, at least in part, on the determined second characteristic of the ambient environment, without interrupting the autonomous operation of the RC vehicle.

Clause 14: The system according to any of clauses 11-13, wherein the memory of the modular device is further configured to store a simulation layer that, when executed by the processor, causes the processor to generate a simulated RC vehicle within a simulated ambient environment based, at least in part, on the signal received from the sensor.

Clause 15: The system according to any of clauses 11-14, wherein, when executed by the processor, the simulation layer further causes the processor to receive telemetry from the RC vehicle, and wherein the generation of the simulated RC vehicle and the simulated ambient environment is further based on the telemetry received from the RC vehicle.

Clause 16: The system according to any of clauses 11-15, wherein the telemetry includes at least one of: a six-degree-of-freedom location of the RC vehicle, a velocity of the RC vehicle, an acceleration of the RC vehicle, and a steering angle of the RC vehicle, or combinations thereof.

Clause 17: The system according to any of clauses 11-16, further including a head mounted display configured to be worn by a user of the system, wherein the head mounted display is configured to display the simulated RC vehicle within the simulated ambient environment.

Clause 18: A method of autonomously driving of a radio controlled (RC) vehicle through an ambient environment, the method including: selectively coupling a modular device to the RC vehicle, wherein the modular device includes at least one sensor configured to generate signals associated with characteristics of the ambient environment, selectively coupling a modular control circuit to the RC vehicle, receiving, via a remote computing device, a signal from the sensor, determining, via the remote computing device, a characteristic of the ambient environment detected by the sensor based on the signal received from the sensor, generating, via the remote computing device, a command signal based, at least in part, on the determined characteristic of the ambient environment, and transmitting, via the remote computing device, via the generated command signal to the modular control circuit, and autonomously operating the RC vehicle, via the modular control circuit, according to the received command signal.

Clause 19: The method according to clause 18, further including: generating, via the remote computing device, a simulated RC vehicle within a simulated ambient environment based, at least in part, on the signal received from the sensor, and displaying, via a head mounted display communicably coupled to the remote computing device, the simulated RC vehicle within the simulated ambient environment.

Clause 20: The system according to either of clauses 18 or 19, further including: receiving, via the remote computing device, telemetry from the RC vehicle, and updating the simulated RC vehicle and the simulated ambient environment based, at least in part, on the telemetry received from the RC vehicle.

Clause 21: The method according to any of clauses 18-20, further including: receiving, via the modular device, a manually implemented command signal from a user of the RC vehicle, and modifying, via a platform executed by the modular device, the manually implemented command signal based on an autonomously generated parameter characteristic of the simulated ambient environment.

Clause 22: The method according to any of clauses 18-21, wherein the autonomously generated parameter is generated based on the signal received from the sensor and corresponds to the determined characteristic of the ambient environment.

Clause 21: The method according to any of clauses 18-20, wherein the autonomously generated parameter includes a generated characteristic of the simulated ambient environment that does not exist in the ambient environment.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure, and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"), the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

Unless specifically stated otherwise, discussions herein using words such as "processing," "computing," "calculating," "determining," "presenting," "displaying," or the like may refer to actions or processes of a machine 1100 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A system for providing autonomous driving of a radio controlled (RC) vehicle using a user's mobile device, the mobile device comprising at least one sensor and a communication interface, the system comprising:
a chassis configured to be mounted onto the RC vehicle, the chassis comprising:
a slot configured to carry the user's mobile device, wherein the user's mobile device is a smartphone; and
circuitry configured to communicatively couple to the RC vehicle and to send signals to operate the RC vehicle;
the circuitry comprising an interface to connect to the communication interface of the user's mobile device and configured to receive commands from the user's mobile device that are routed to the RC vehicle.

2. The system of claim 1, wherein the circuitry is further configured to receive commands from the user's mobile device that utilize the at least one sensor.

3. The system of claim 1, further comprising a virtualization layer expressed in software or firmware stored in a memory and configured to cause a processor to provide a platform for programming artificial intelligence (AI) to control the RC vehicle.

4. The system of claim 3, wherein the virtualization layer comprises a simulator abstraction module, an autonomous driving abstraction module, and a vehicle hardware abstraction module.

5. The system of claim 4, wherein the virtualization layer is further configured to cause the processor to provide the platform for programming AI via a software simulator connected to the simulator abstraction module, wherein the software simulator is operated on a user device separate from the user's mobile device.

6. The system of claim 1, further comprising an interface to a virtual reality (VR) or augmented reality (AR) device that can be worn by the user such that the user is able to see a camera view of the user's mobile device while the mobile device is mounted on the RC vehicle when the RC vehicle is moving.

7. The system of claim 6, wherein the VR or AR interface is configured to provide live visual streaming to the VR or AR device, using a visual data streaming functionality of the user's mobile device.

8. The system of claim 1, wherein the circuitry is further configured to communicate with a manual interface to the RC vehicle.

9. The system of claim 7, wherein the circuitry is further configured to send commands to the RC vehicle based on received inputs from the manual interface.

10. The system of claim 1, wherein the circuitry comprises a safe mode component that is configured to override commands received from the user's mobile device.

* * * * *